(12) United States Patent
Kotzur et al.

(10) Patent No.: US 9,734,106 B2
(45) Date of Patent: Aug. 15, 2017

(54) SYSTEMS AND METHODS FOR PROVIDING CONNECTIONS TO AN INFORMATION HANDLING SYSTEM

(71) Applicant: Dell Products L.P., Round Rock, TX (US)

(72) Inventors: Gary B. Kotzur, Austin, TX (US); William Lynn, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 329 days.

(21) Appl. No.: 14/289,793

(22) Filed: May 29, 2014

(65) Prior Publication Data

US 2014/0359189 A1    Dec. 4, 2014

Related U.S. Application Data

(60) Provisional application No. 61/829,388, filed on May 31, 2013.

(51) Int. Cl.
*G06F 13/20* (2006.01)
*G06F 13/38* (2006.01)

(52) U.S. Cl.
CPC .................................. *G06F 13/385* (2013.01)

(58) Field of Classification Search
None
See application file for complete search history.

(56) References Cited

U.S. PATENT DOCUMENTS

| | | | |
|---|---|---|---|
| 7,363,417 B1* | 4/2008 | Ngai | G06F 13/4022 710/305 |
| 2001/0014927 A1* | 8/2001 | Chang | G06F 13/409 710/301 |
| 2009/0157920 A1* | 6/2009 | Foster, Sr. | G06F 13/409 710/62 |
| 2009/0172185 A1* | 7/2009 | Chandra | G06F 13/387 709/236 |
| 2011/0264840 A1* | 10/2011 | Loffink | H01R 13/70 710/315 |

* cited by examiner

*Primary Examiner* — Ilwoo Park
(74) *Attorney, Agent, or Firm* — Jackson Walker L.L.P.

(57) ABSTRACT

In accordance with embodiments of the present disclosure, an interface for an information handling system comprising a connector, wherein the connector comprises a legacy portion and an expanded portion. The legacy portion may comprise a plurality of signal pins defining a first set of lanes of communication between the information handling system and an information handling resource coupled to the connector. The expanded portion comprising a plurality of signal pins defining a second set of lanes of communication between the information handling system and an information handling resource coupled to the expanded portion.

19 Claims, 12 Drawing Sheets

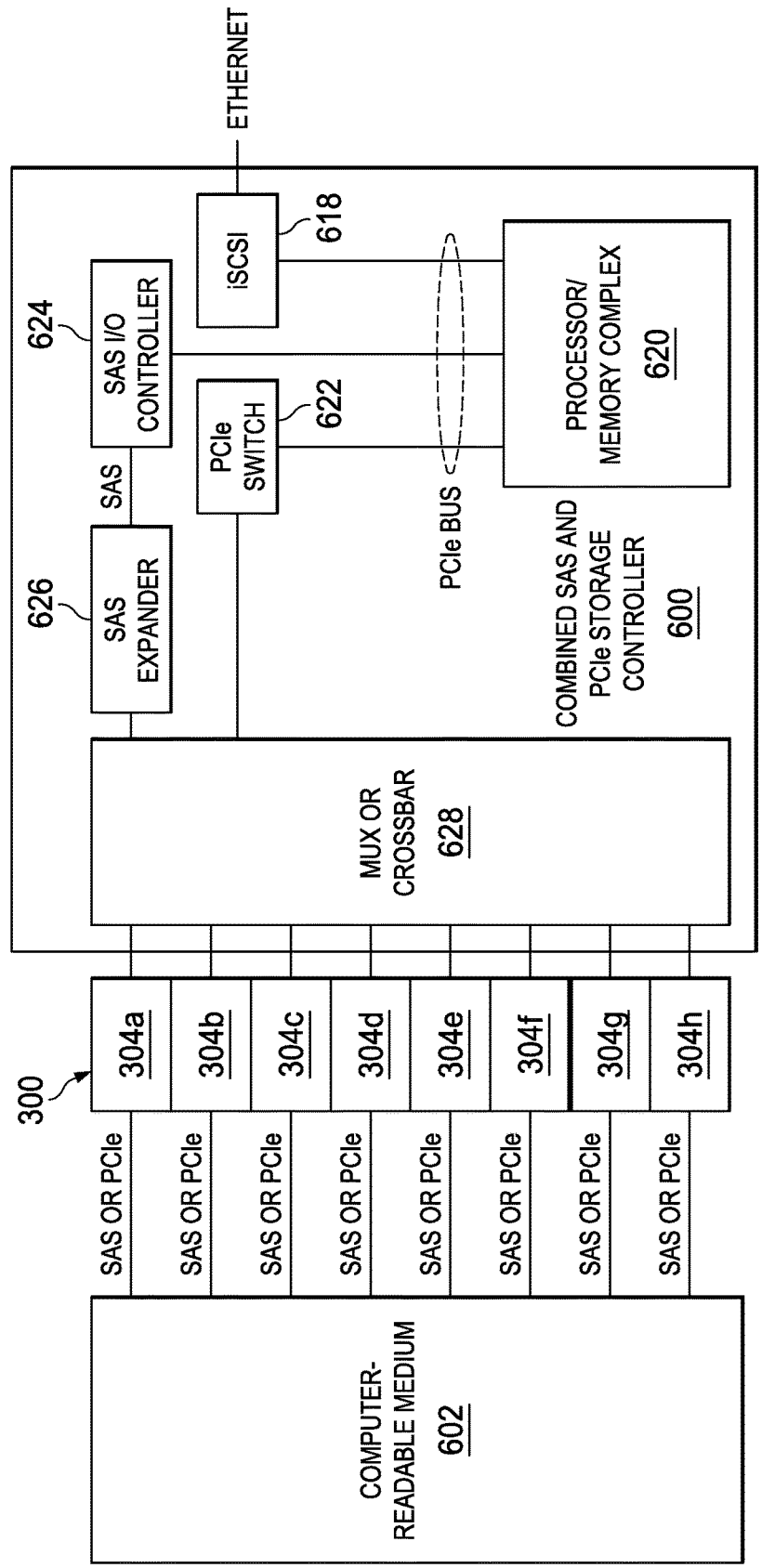

SYSTEMS AND METHODS FOR PROVIDING CONNECTIONS TO AN INFORMATION HANDLING SYSTEM

RELATED APPLICATION

The present disclosure claims priority to U.S. Provisional Patent Application Ser. No. 61/829,388, filed May 31, 2013, which is incorporated by reference herein in its entirety.

TECHNICAL FIELD

The present disclosure relates in general to information handling systems, and more particularly to a system and method for providing connections to an information handling system from storage media and/or other information handling resources.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Flash memory is a non-volatile data storage device that can be electronically erased and reprogrammed. The performance of an information handling system, such as a server, may be improved by using flash memory which provides bulk storage and/or high speed caching. A Flash Solid-State Drive ("SSD") is a type of flash memory that uses solid-state memory to store persistent data. An SSD emulates a hard disk drive interface and may replace it in many applications.

Small Computer System Interface ("SCSI") is a set of standards for physically connecting and transferring data between information handling systems and peripheral devices such as data storage devices. Serial Attached SCSI ("SAS") is an evolution of the traditional SCSI into a point-to-point serial peripheral interface in which controllers are linked directly to disk drives. SAS provides an improvement over the traditional SCSI because it enables multiple devices of different sizes and types to be connected simultaneously with thinner and longer cables. In addition, SAS drives can be hot-plugged. Specifically, SAS drives may be connected to or removed from an information handling system while the information handling system is running and the operating system of the information handling system can recognize that change.

Advanced Technology Attachment ("ATA") is another disk drive implementation for an information handling system that integrates the controller on the disk drive itself. Serial ATA ("SATA") is an evolution of the traditional ATA and is a serial link, typically consisting of a single cable with a minimum of four wires. The SATA creates a point-to-point connection between devices. The thin SATA cables facilitate more efficient air flow inside a form factor and also allow for smaller chassis designs. The term "form factor" refers to the physical shape and size of a device and may be used to describe the size of a circuit board.

Typically, the capabilities of SAS and SATA Flash SSDs may be limited by the interface. Specifically, the single or dual SATA or SAS lanes to the end data storage device may adversely impact system operations by causing latency and limiting throughput. Similarly, Flash Solid State Cards or Peripheral Component Interconnect Express ("PCIe") Flash cards are limited by the confines of their respective form factors which support hot plug but not in a manner acceptable to system users.

Hot plug in a data center environment is preferably achieved through front or back loading modules. The current high performance storage form factor is the 2.5-inch hard disk drive. It is desirable to put PCIe SSDs in this form factor for system design and customer usage. However, from a system design perspective, co-locating two different connectors is challenging due to the need for front to back airflow in data center hardware. Specifically, two physical connectors, one for SAS devices and one for PCIe devices, block any opportunity for cooling vent holes in the storage device backplanes. One existing solution is the Small Form Factor Committee (SFF) 8639 connector, which provides for six differential and bidirectional lanes of traffic for communication via relevant SAS and PCIe standards. Such a format limits communication to six total lanes, with SAS communication limited to four lanes at a time and PCIe communication limited to four lanes at a time. Solutions whereby eight lanes of communication are supported, with all lanes capable of supporting up to eight lanes of communication for PCIe or for SAS, and a combination of PCIe and SAS lanes (e.g., four of each), may be desired. Another existing solution the SFF-9639 connector.

Such eight-lane solutions have been proposed, such as that set forth in the specification for the SFF-8631 connector. However, such solutions may not provide backwards compatibility or interoperability with storage media or other information handling resources designed for use with the six-lane SFF-8639 or SFF-9639 connector.

SUMMARY

In accordance with the teachings of the present disclosure, the disadvantages and problems associated with traditional connector form factors may have been reduced or eliminated.

In accordance with embodiments of the present disclosure, an interface for an information handling system comprising a connector, wherein the connector comprises a legacy portion and an expanded portion. The legacy portion may comprise a plurality of signal pins defining a first set of lanes of communication between the information handling system and an information handling resource coupled to the connector. The expanded portion comprising a plurality of signal pins defining a second set of lanes of communication between the information handling system and an information handling resource coupled to the expanded portion. The legacy portion and the expanded portion may be configured such that when an information handling resource is coupled to the connector such that the legacy portion engages with the information handling resource and the expanded portion does not, the connector enables communication between the information handling system and the information handling resource via one or more lanes comprising the first set of lanes, and when an information handling resource is coupled to the connector such that the legacy portion and the expanded portion engages with the information handling resource, the connector enables communication between the information handling system and the information handling resource via one or more lanes comprising the first set of lanes and the second set of lanes.

In accordance with these and other embodiments of the present disclosure, a method for transferring data, may include coupling a connector to a controller, the connector comprising a legacy portion comprising a plurality of signal pins defining a first set of lanes of communication between an information handling system and an information handling resource coupled to the connector and an expanded portion comprising a plurality of signal pins defining a second set of lanes of communication between the information handling system and an information handling resource coupled to the expanded portion, wherein the controller controls the first set of lanes and the second set of lanes. The method may also include connecting an information handling resource to the connector. The method may additionally include communicating data between the information handling system and the information handling resource via one or more lanes comprising the first set of lanes when the information handling resource is coupled to the connector such that the legacy portion engages with the information handling resource and the expanded portion does not. The method may further include communicating data between the information handling system and the information handling resource via one or more lanes comprising the first set of lanes and the second set of lanes when the information handling resource is coupled to the connector such that the legacy portion and the extended portion both engage with the information handling resource.

Technical advantages of the present disclosure will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIGS. 6A, 6B, 6C, 7A, 7B, 7C, 7D, 7E, 8A, and 8B each depict exemplary modes of operation of the eight-lane receptacle connector of FIG. 3 in accordance with embodiments of the present disclosure.

DETAILED DESCRIPTION

Preferred embodiments and their advantages are best understood by reference to FIGS. 1 and 3 through 8B, wherein like numbers are used to indicate like and corresponding parts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

Figure 1:
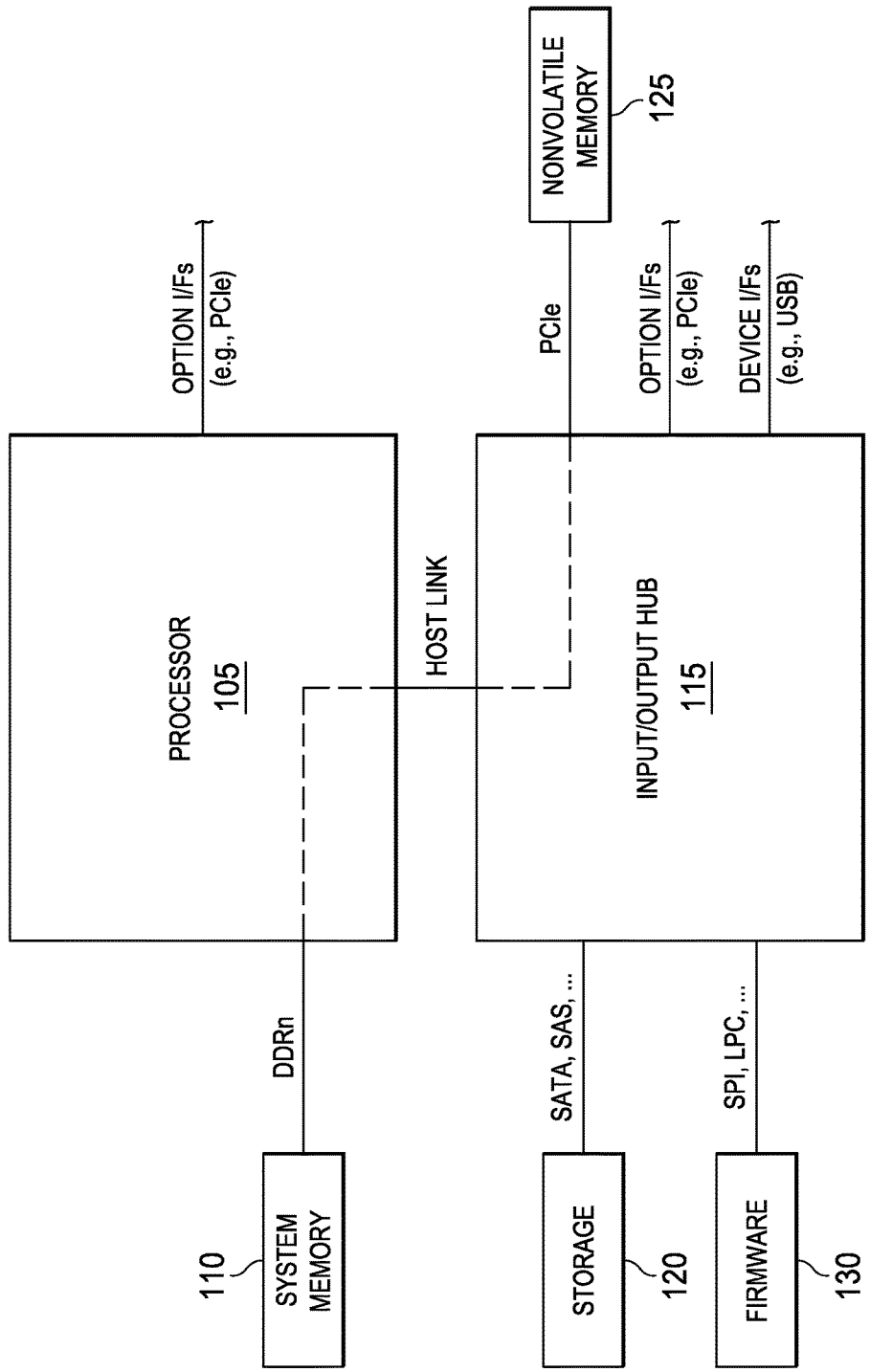
FIG. 1 illustrates a block diagram showing an example information handling system, in accordance with embodiments of the present disclosure.

FIG. 1 illustrates a block diagram showing an example information handling system, in accordance with embodiments of the present disclosure. Information handling system 100 may comprise a personal computer (e.g., a desktop computer, workstation or portable computer), a storage enclosure or a server. As depicted in FIG. 1, information handling system 100 may include a processor 105, a system memory 110 communicatively coupled to processor 105, an I/O hub 115 communicatively coupled to processor 105, storage 120 communicatively coupled to I/O hub 115, nonvolatile memory 125 communicatively coupled to I/O hub 115, and firmware 130 communicatively coupled to I/O hub 115.

Processor 105 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 105 may interpret and/or execute program instructions and/or process data stored in system memory 110, storage media 120 and/or another component of information handling system 100. Processor 105 may be coupled to other components (not shown) with optional interfaces (I/Fs) via a PCIe interface, for example.

System memory 110 may be communicatively coupled to processor 105, for example, via a DDRn (a version of a double-date-rate type) interface. System memory 110 may include any system, device, or apparatus configured to retain program instructions and/or data for a period of time (e.g., computer-readable media). System memory 110 may include random access memory (RAM), electrically erasable programmable read-only memory (EEPROM), a PCMCIA card, flash memory, magnetic storage, opto-magnetic storage, or any suitable selection and/or array of volatile memory. Note that apparatuses and methods described may apply to the volatile portions of system memory 110.

Processor 105 may be coupled to an I/O hub 115 via a host link, for example. I/O hub 115 may be communicatively coupled to storage 120 via, for example, a SCSI, Internet SCSI (iSCSI), SAS or any other transport that operates with the SCSI protocol, ATA, SATA, advanced technology attachment packet interface (ATAPI), serial storage architecture (SSA), integrated drive electronics (IDE), and/or any combination thereof. Storage 120 may include computer-readable media (e.g., hard disk drive, floppy disk drive, CD-ROM, and/or other type of rotating storage media, flash memory, EEPROM, and/or other type of solid state storage media) and may be generally operable to store data and/or programs (e.g., one or more operating systems and/or one or more application programs).

I/O hub 115 may be communicatively coupled to firmware 130 via any suitable interface such as SPI (System Packet Interface), LPC (Low Pin Count) interface, for example. The information handling system 100 may include one or more components that process and/or operate based on firmware embedded in or coupled to the component. For example, such components may include hard disk drives (HDDs), CD-ROM drives, and DVD drives, and/or various other devices and the like that include controllers driven by firmware. Firmware may be the program code embedded in a storage device and maintained within or coupled to the device. The firmware for a component most often comprises the operational code for the component.

More generally, firmware may include program code operable to control a plurality of information handling system 100 operations. System memory 110, for example, may store firmware such as a basic input/output system (BIOS) program, and/or device drivers such as network interface card (NIC) drivers. A device driver may include program code operable to facilitate interaction of a hardware device with other aspects of information handling system 100. A BIOS program may include software that facilitates interaction with and between the information handling system 100 devices such as a keyboard, a mouse, and/or one or more I/O devices. Information handling system 100 may operate by executing BIOS for a system firmware in response to being powered up or reset. BIOS may identify and initialize components of system 100 and cause an operating system to be booted.

I/O hub 115 may be communicatively coupled to nonvolatile memory 125 via a PCIe interface, for example. Nonvolatile memory 125 may include, for example, fast nonvolatile memory such as flash memory, NVDIMMs (nonvolatile dual in-line memory modules), a PCIe (Peripheral Component Interconnect Express) add-in-card, a direct connect nonvolatile interface (e.g., an ONFI (Open NAND Flash Interface Working Group) interface), a SSD (solid-state drive), or another storage type configured for fast restart. I/O hub 115 may be coupled to other components (not shown) with optional I/Fs such as a PCIe interface and device I/Fs such as a USB (Universal Serial Bus) interface, for example.

Although information handling system 100 is explicitly depicted as including particular information handling resources in FIG. 1, information handling system 100 may include one or more other information handling resources in addition to those shown in FIG. 1 and described above.

Figure 2:
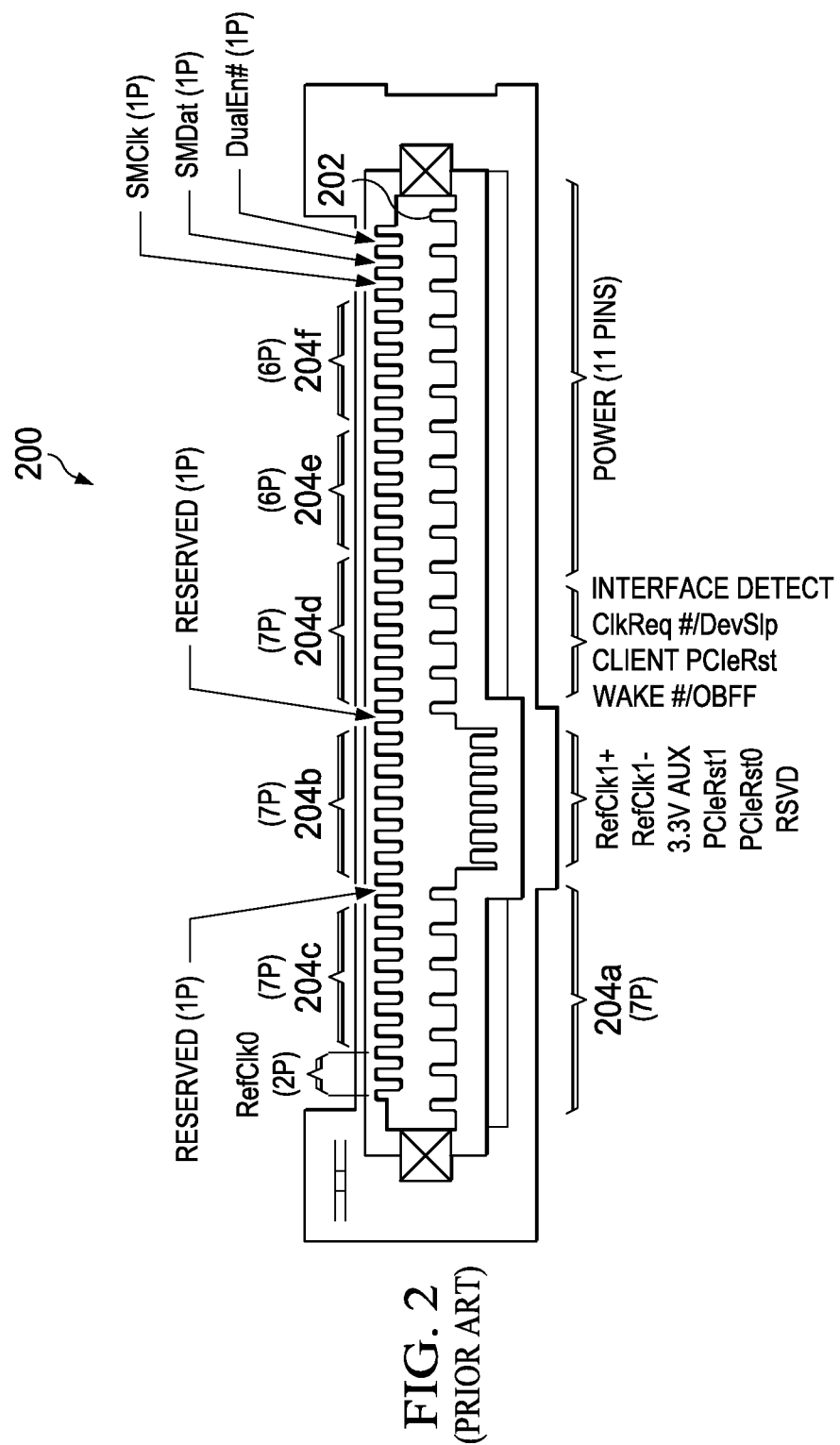
FIG. 2 illustrates a side view of a six-lane receptacle connector, as is known in the art.

FIG. 2 illustrates a side view of a six-lane receptacle connector 200, as is known in the art. Such a six-lane drive plug connector may include an SFF-8639 connector or SFF-9639 connector. As shown in the pin out depicted in FIG. 2, each of the pins 202 may be assigned a particular function, including pins making up each of communication lanes 204a-204f. In some embodiments, each communication lane 204 may enable differential bidirectional communication (e.g., between an information handling system backplane and an information handling resource electrically coupled to receptacle connector 200). In these and other embodiments, some of communication lanes 204 (e.g., lanes 204a and 204c) may be dedicated for communication via a first communication standard (e.g., SAS), some of communication lanes 204 (e.g., lanes 204b and 204f) may be dedicated for communication via a second communication standard (e.g., PCIe), and some of communication lanes (e.g., lanes 204d and 204e) may be shared allowing for communication via either the first communication standard or the second communication standard based on configuration of a controller or other information handling resource for controlling communication via receptacle connector 200.

Figure 3:
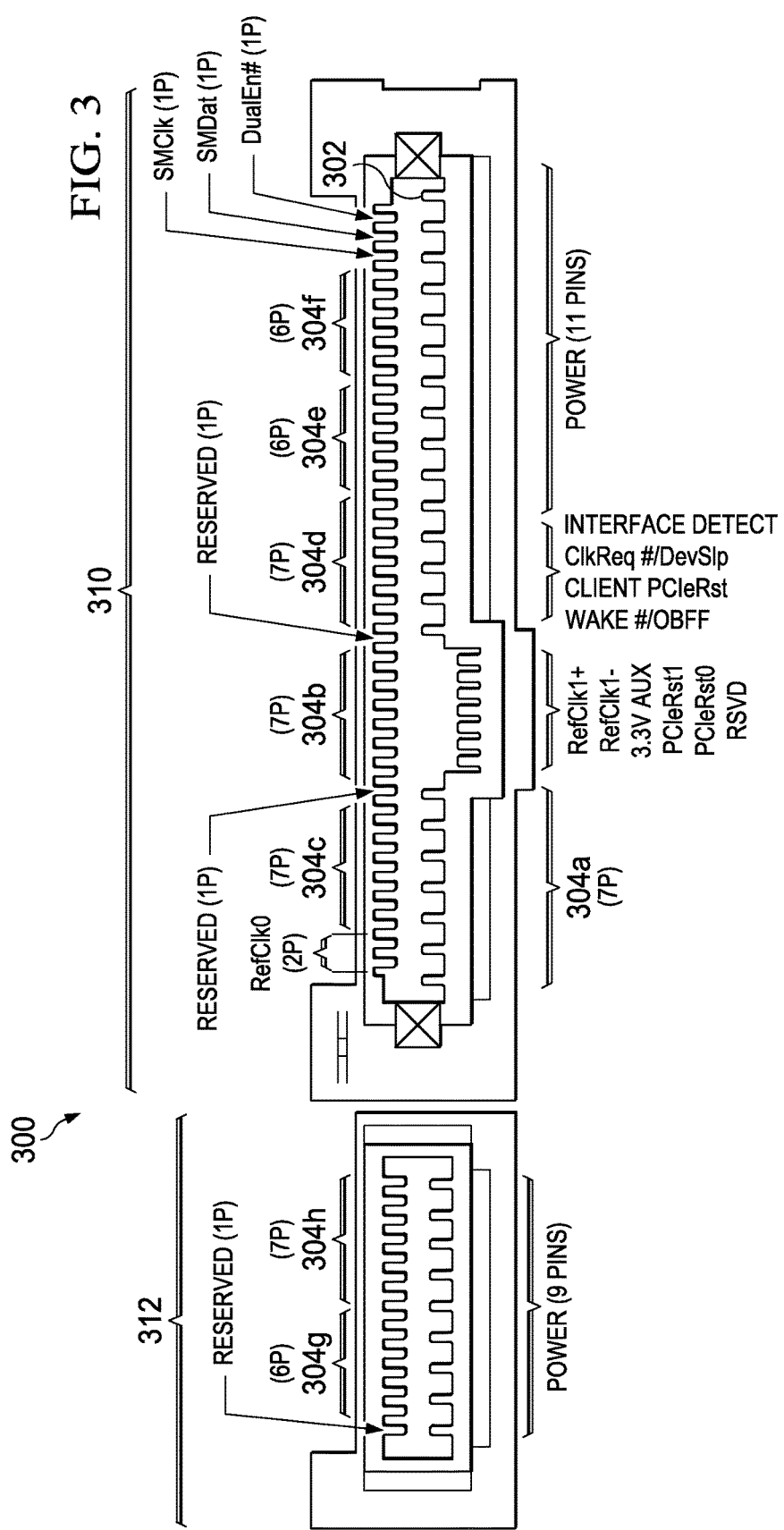
FIG. 3 illustrates a side view of an eight-lane receptacle connector, in accordance with embodiments of the present disclosure.

FIG. 3 illustrates a side view of an eight-lane receptacle connector 300, in accordance with embodiments of the present disclosure. As shown in FIG. 3, receptacle connector 300 may include a legacy portion 310 and an expanded portion 312. Legacy portion 310 may have a structure similar or identical to that of six-lane receptacle connector 200, and may also have similar functionality to that of six-lane receptacle connector 200 when an information handling resource designed for use with a six-lane receptacle connector is engaged with receptacle connector 300. Accordingly, legacy portion 310 may have a pin out for pins 302 comprising six lanes 304a-304f for differential bidirectional communication. Expanded portion 312 may include pins 302 with a pin out defining two addition lanes 304g and 304h for differential bidirectional communication. In some embodiments, some of communication lanes 304 (e.g., four of communication lanes 304) may be dedicated for communication via a first communication standard (e.g., SAS) while other communication lanes 304 (e.g., a different four of communication lanes 304) may be dedicated for communication via a second communication standard (e.g., PCIe). In these and other embodiments, some or all of communication lanes 304 may be shared allowing for communication via either a first communication standard (e.g., SAS) or a second communication standard (e.g., PCIe) based on configuration of a controller or other information handling resource for controlling communication via receptacle connector 300.

Figure 4:
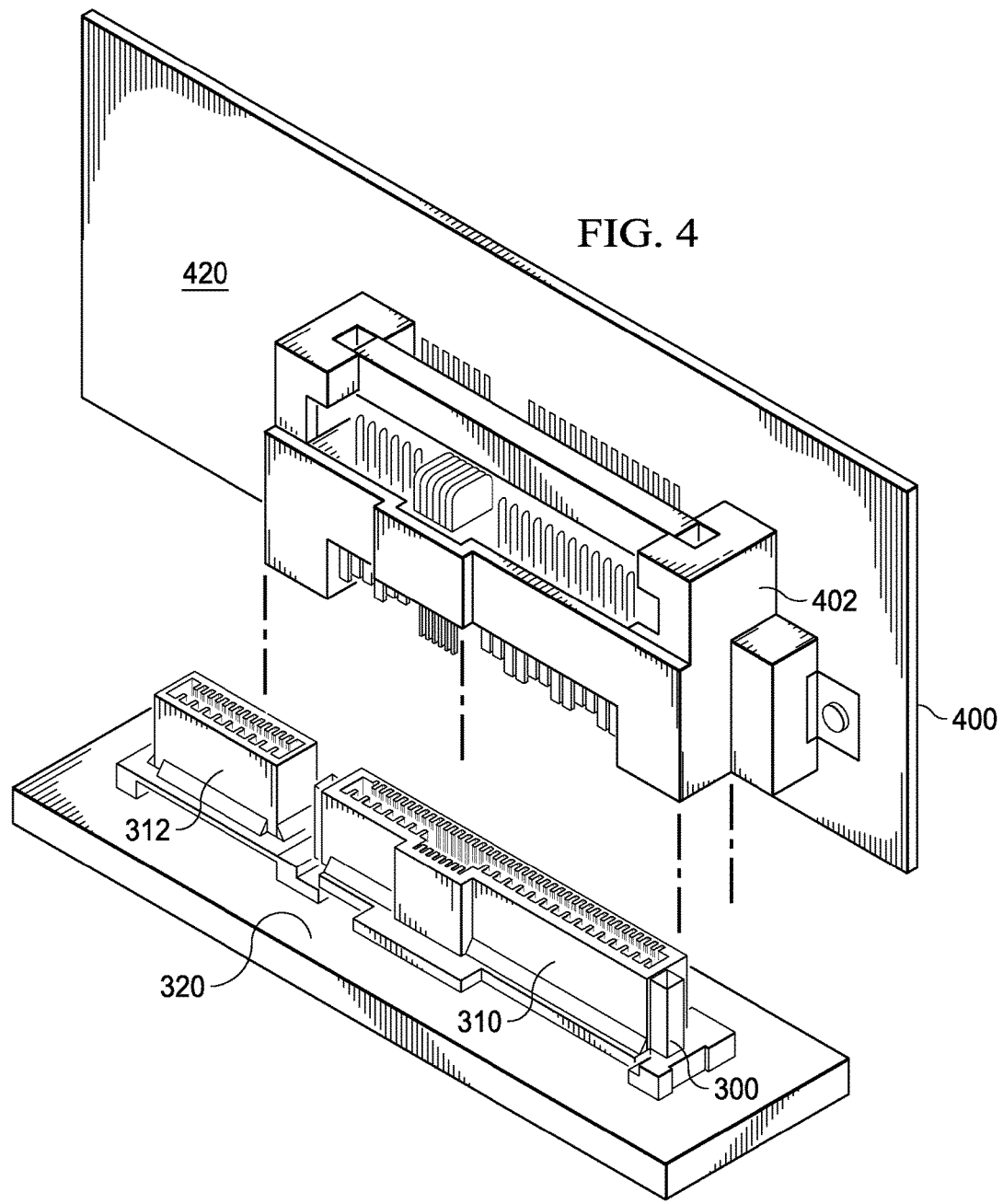
FIG. 4 illustrates a perspective view of an information handling resource designed for use with the six-lane receptacle connector of FIG. 2 engaging with the eight-lane receptacle connector of FIG. 3.

FIG. 4 illustrates a perspective view of an information handling resource 400 designed for use with six-lane connector 200 engaging with eight-lane connector 300. In some embodiments, information handling resource 400 may comprise a computer-readable medium (e.g., hard disk drive, flash solid stage storage device, etc.). In these and other embodiments, information handling resource 400 may comprise, among one or more other elements, a plug connector 402 electrically and/or mechanically mounted to a backplane 420. Plug connector 402 may electrically and mechanically mate with legacy portion 310 of receptacle connector 300 (which, as shown in FIG. 4, may be mounted to a backplane 320) such that when so mated, expanded portion 312 of receptacle connector 300 remains unoccupied, thus providing communication paths on the six lanes present within legacy portion 310 defined by the pin out of receptacle connector 300.

Figure 5:
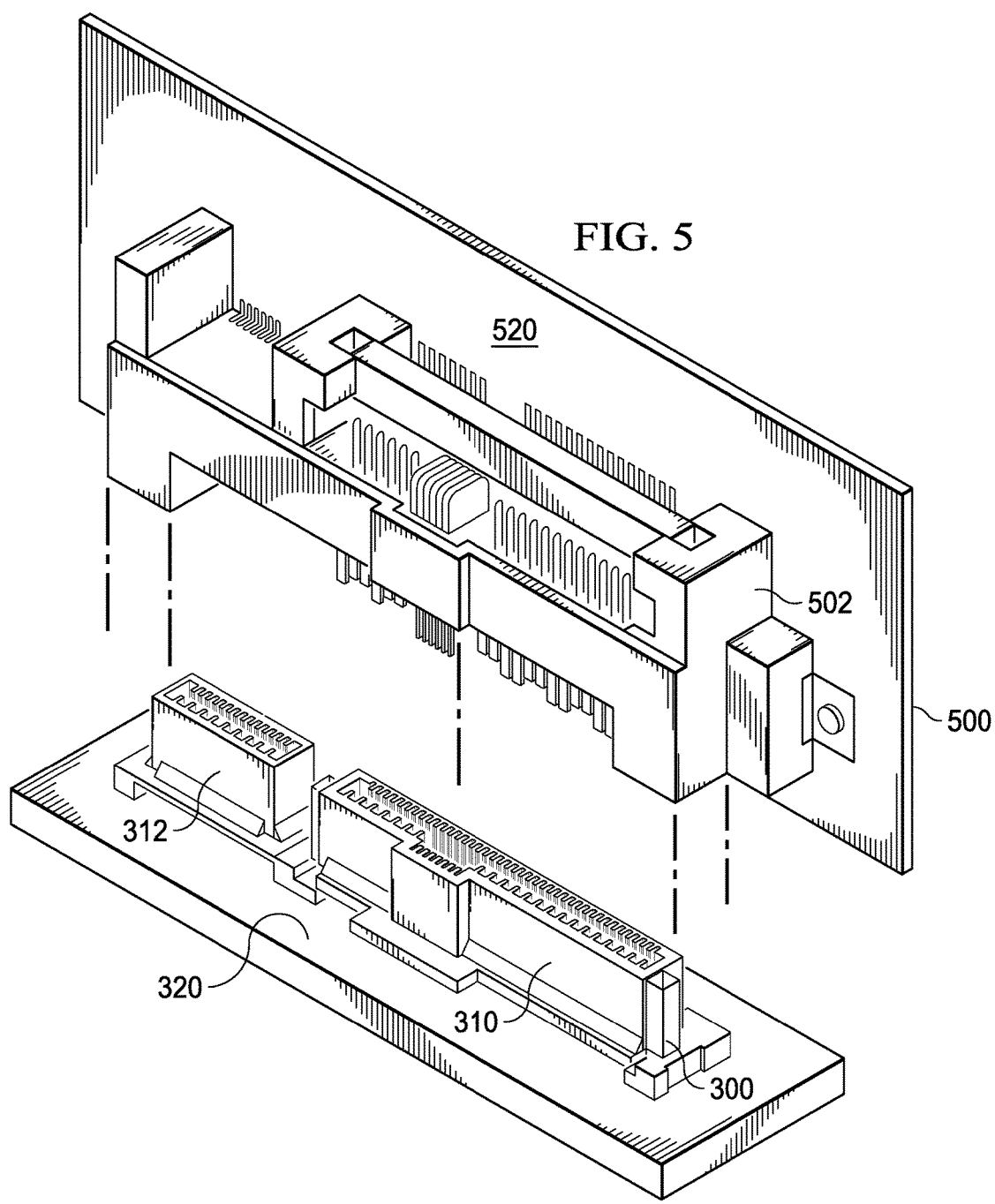
FIG. 5 illustrates a perspective view of an information handling resource designed for using all eight lanes of the eight-lane receptacle connector of FIG. 3 engaging with the eight-lane receptacle connector of FIG. 3.

FIG. 5 illustrates a perspective view of an information handling resource 500 designed for using all eight lanes of eight-lane receptacle 300 and engaging with eight-lane receptacle 300. In some embodiments, information handling resource 500 may comprise a computer-readable medium (e.g., hard disk drive, flash solid stage storage device, etc.). In these and other embodiments, information handling resource 500 may comprise, among one or more other elements, a plug connector 502 electrically and/or mechanically mounted to a backplane 520. Plug connector 502 may electrically and mechanically mate with both of legacy portion 310 and expanded portion 312 of receptacle connector 300 (which, as shown in FIG. 5, may be mounted to a backplane 320), thus providing communication paths on for all eight lanes defined by the pin out of receptacle connector 300. Likewise, a legacy six-port receptacle connector 200 may also electrically and mechanically mate with an eight-port plug connector 502.

The systems and methods disclosed herein may be used to support multiplexed or discrete signal operations between a controller (e.g., SAS controller, PCIe controller/card) integral to an information handling system and an information handling resource (e.g., a computer-readable medium).

Figure 6A:
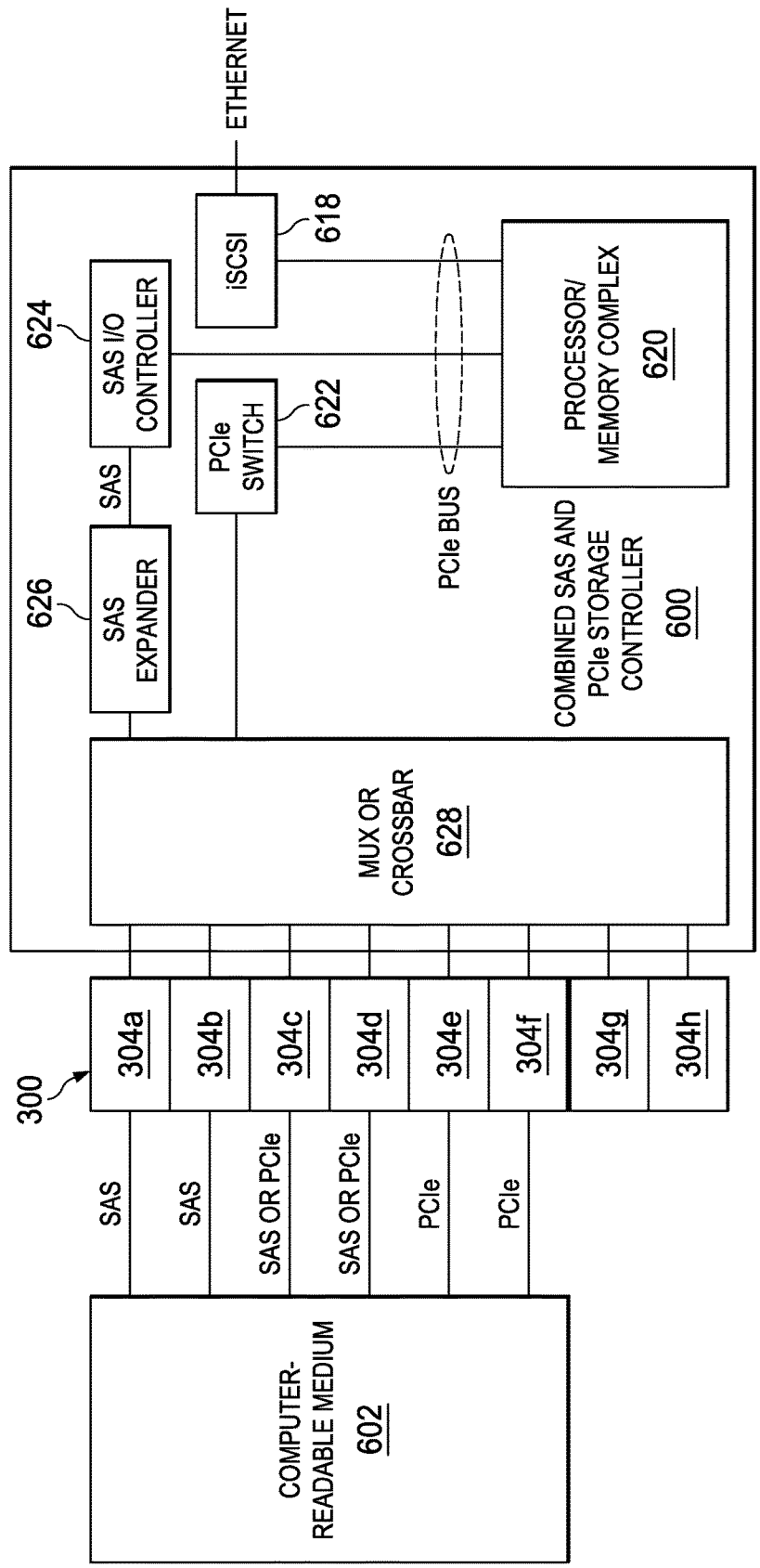
Figure 6B:
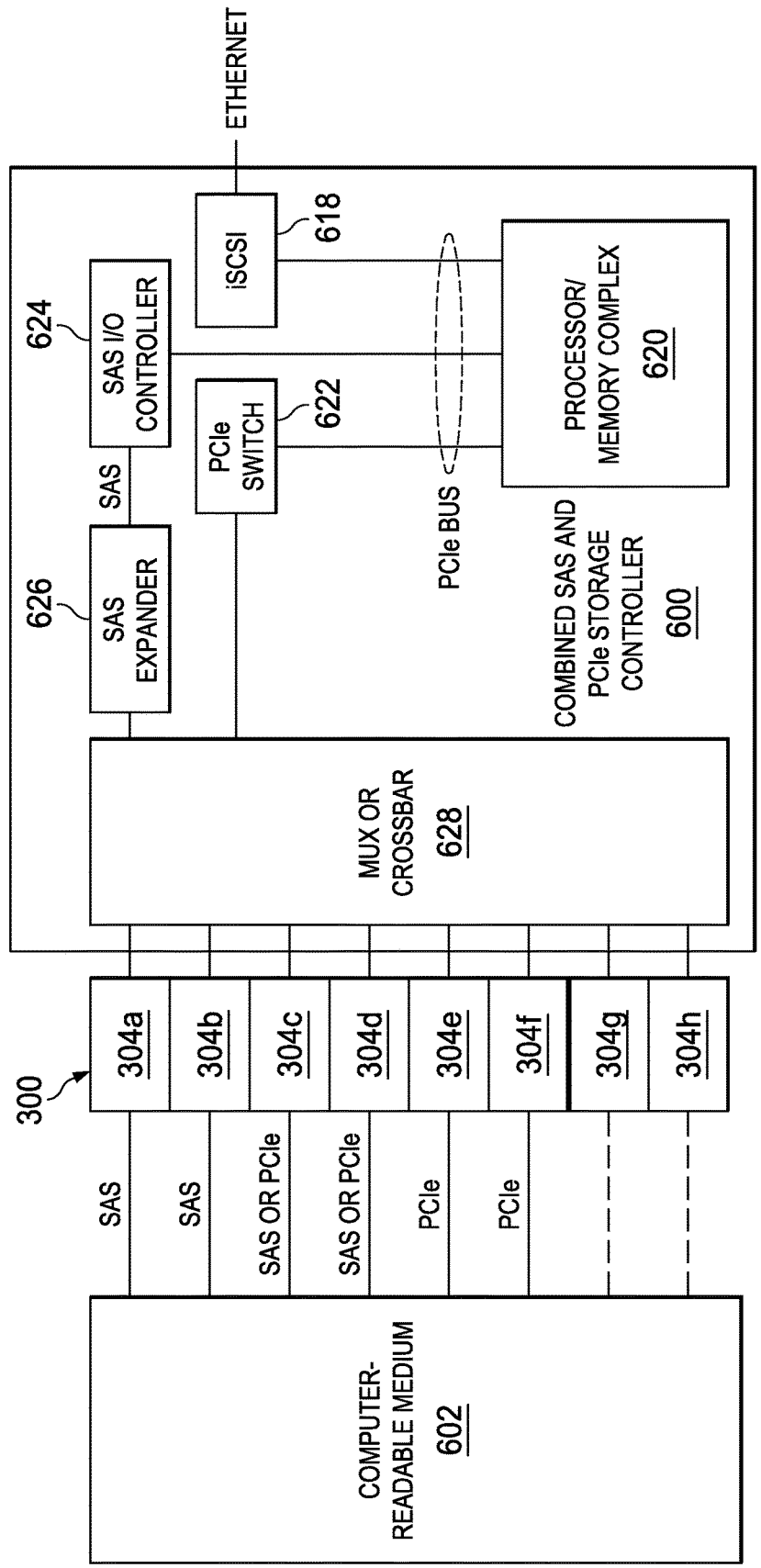

FIGS. 6A, 6B, 6C, 7A, 7B, 7C, 7D, 7E, 8A, and 8B each depict example modes of operation of the eight-lane receptacle connector of FIG. 3 in accordance with embodiments of the present disclosure. FIGS. 6A, 6B, and 6C each depict a mode of operation in which a computer-readable medium (e.g., PCIe SSD, SAS hard drive, etc.) may be coupled via receptacle connector 300 to a combined SAS and PCIe storage controller 600. In these modes of operation, controller 600 may be connected to a network, such as, for example, the Ethernet, through an iSCSI 618 or another suitable interface. The iSCSI interface 618 may be communicatively coupled to a processor/memory complex 620 of controller 600. Processor/memory complex 620 may be communicatively coupled to a PCIe switch 622 and a SAS I/O controller 624. The SAS I/O Controller 624 may in turn be communicatively coupled to a SAS expander 626. Each of PCIe switch 622 and SAS expander 626 may be coupled to a multiplexer 628. The multiplexer 628 selects which of the SAS signal from the SAS expander 626 and the PCIe signal from the PCIe switch 622 will be directed to each lane of the enhanced SAS connector 600. Accordingly, in the modes of operation depicted in FIGS. 6A, 6B, and 6C, all of the lanes may be operable to transmit both SAS and PCIe data.

As shown in FIG. 6A, receptacle connector 300 coupled to controller 600 may support signal communication with a computer-readable medium 602 designed for operation with the six-lane receptacle connector 200 of FIG. 2. In such mode of operation, up to four of lanes 304a-304f may transmit signals between controller 600 and computer-readable medium 602, while two of such lanes may not transmit despite having corresponding portions of computer-readable medium 602 engaged with pins for such two lanes. In addition, pins for lanes 304g and 304h corresponding to expanded portion 312 may not be engaged with computer-readable medium 602.

As shown in FIGS. 6B and 6C, receptacle connector 300 coupled to controller 600 may support signal communication with a computer-readable medium 602 via any suitable number of lanes 304. FIG. 6B shows operation in a x4 mode of operation in which four of lanes 304a-304f may transmit signals between controller 600 and computer-readable medium 602, while four of such lanes may not transmit despite having corresponding portions of computer-readable medium 602 engaged with pins for such four lanes.

In the modes of operation shown in FIGS. 6A, 6B, and 6C, a discovery process may be required at controller 600 to control multiplexer/crossbar 628 to insure a SAS device or controller plugged into the system does not get driven by PCIe signals, or vice versa.

Figure 7B:
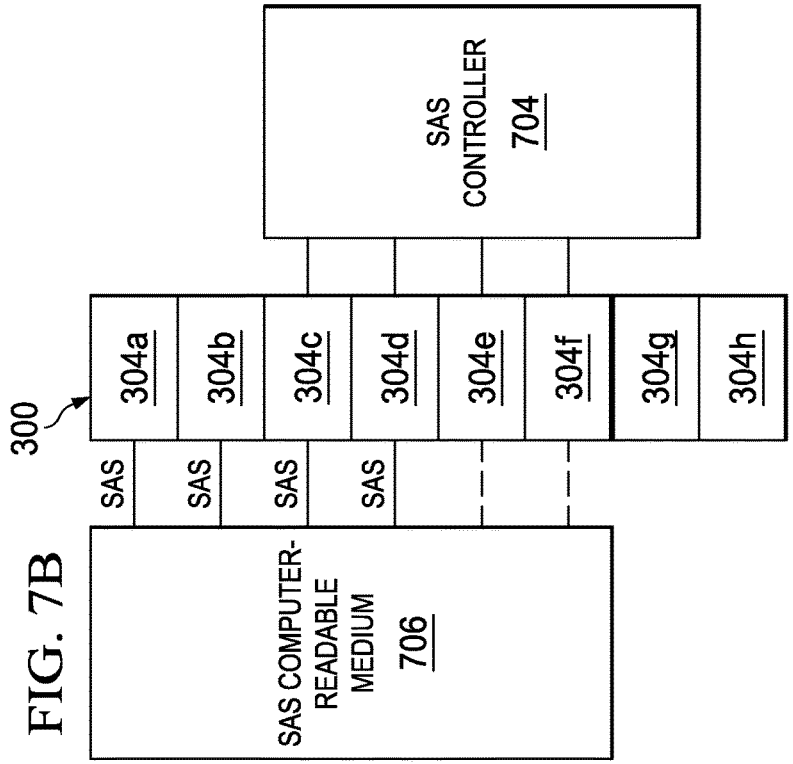
Figure 7A:
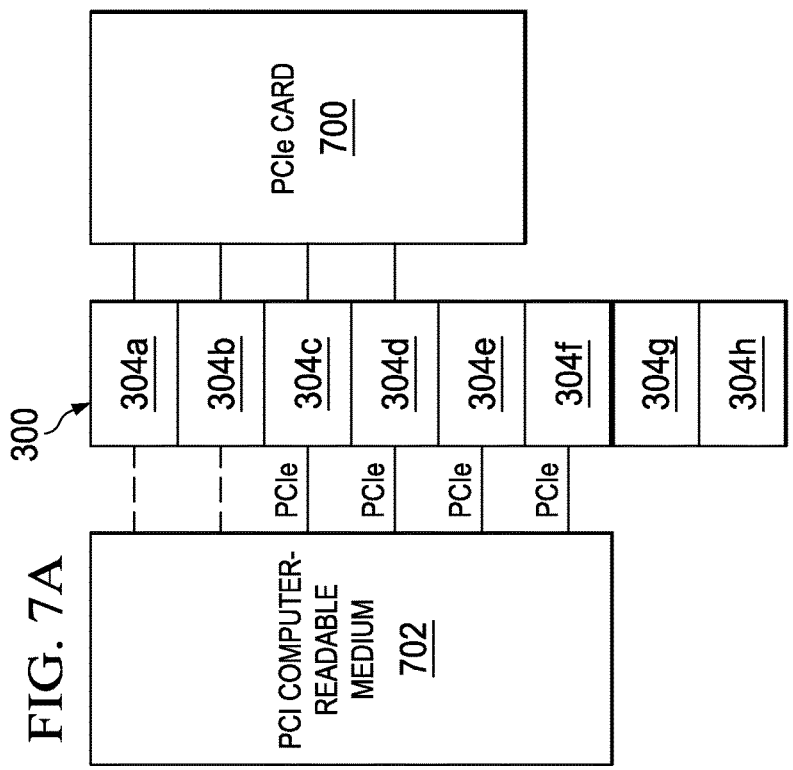

FIGS. 7A, 7B, 7C, 7D and 7E show modes of operation supporting signal communication with a computer-readable medium 602 designed for operation with the six-lane receptacle connector 200 of FIG. 2, wherein signal lanes may be discrete and different between communication standards. For example, as shown in FIG. 7A, when coupled to a PCIe computer-readable medium 702 designed for operation with the six-lane receptacle connector 200 of FIG. 2, up to four of lanes 304 (e.g., 304c-304f) may transmit signals between a PCIe card/controller 700 and computer-readable medium 702, while two lanes (e.g., 304a and 304b) may not transmit despite having corresponding portions of computer-readable medium 702 engaged with pins for such two lanes. In addition, pins for lanes 304g and 304h corresponding to expanded portion 312 may not be engaged with computer-readable medium 702.

As another example, as shown in FIG. 7B, when coupled to a SAS computer-readable medium 706 designed for operation with the six-lane receptacle connector 200 of FIG. 2, up to four of lanes 304 (e.g., 304a-304d) may transmit signals between a SAS controller 704 and computer-readable medium 706, while two lanes (e.g., 304e and 304f) may not transmit despite having corresponding portions of computer-readable medium 706 engaged with pins for such two lanes.

In addition, pins for lanes 304g and 304h corresponding to expanded portion 312 may not be engaged with computer-readable medium 702.

Figure 7D:
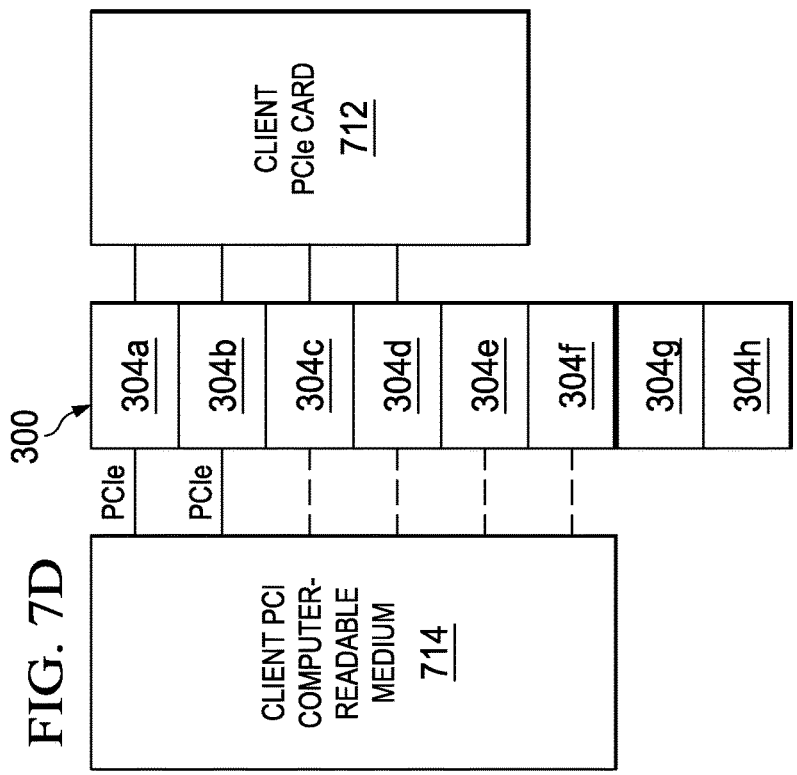
Figure 7C:
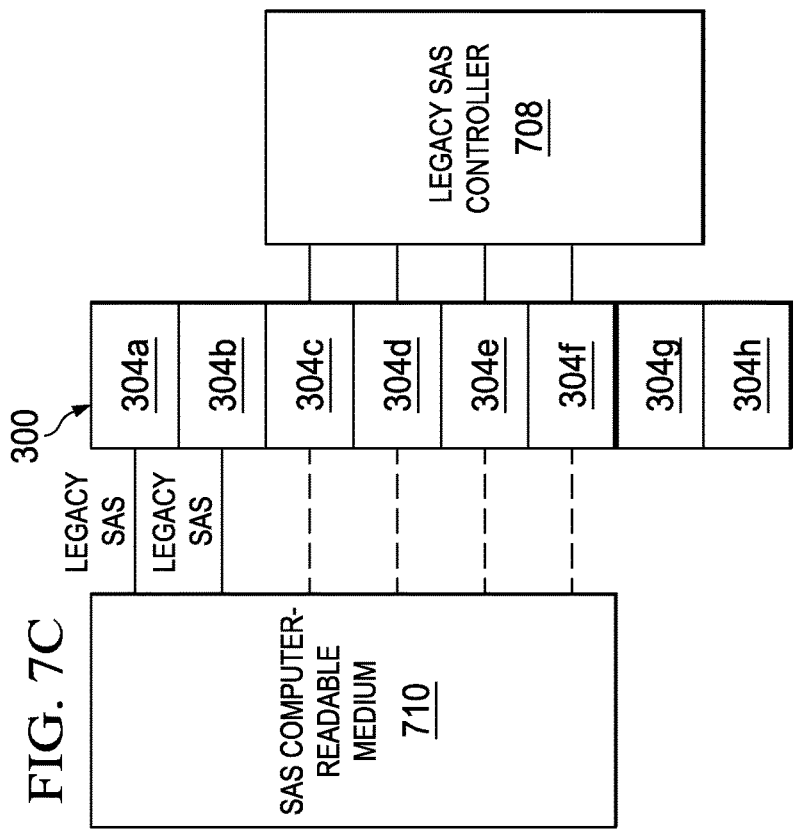

As a further example, as shown in FIG. 7C, when coupled to a legacy SAS computer-readable medium 710 designed for operation with the six-lane receptacle connector 200 of FIG. 2, up to two of lanes 304 (e.g., 304a and 304b) may transmit signals between a legacy SAS controller 708 and computer-readable medium 710, while four lanes (e.g., 304c-f) may not transmit despite having corresponding portions of computer-readable medium 706 engaged with pins for such two lanes. In addition, pins for lanes 304g and 304*h* corresponding to expanded portion 312 may not be engaged with computer-readable medium 702.

As yet another example, as shown in FIG. 7D, when coupled to a client PCIe (or SATA express) computer-readable medium 714 designed for operation with the six-lane receptacle connector 200 of FIG. 2, up to two of lanes 304 (e.g., 304*a* and 304*b*) may transmit signals between a client PCIe card 712 and computer-readable medium 710, while four lanes (e.g., 304*c-f*) may not transmit despite having corresponding portions of computer-readable medium 706 engaged with pins for such two lanes. In addition, pins for lanes 304*g* and 304*h* corresponding to expanded portion 312 may not be engaged with computer-readable medium 702.

Figure 7E:
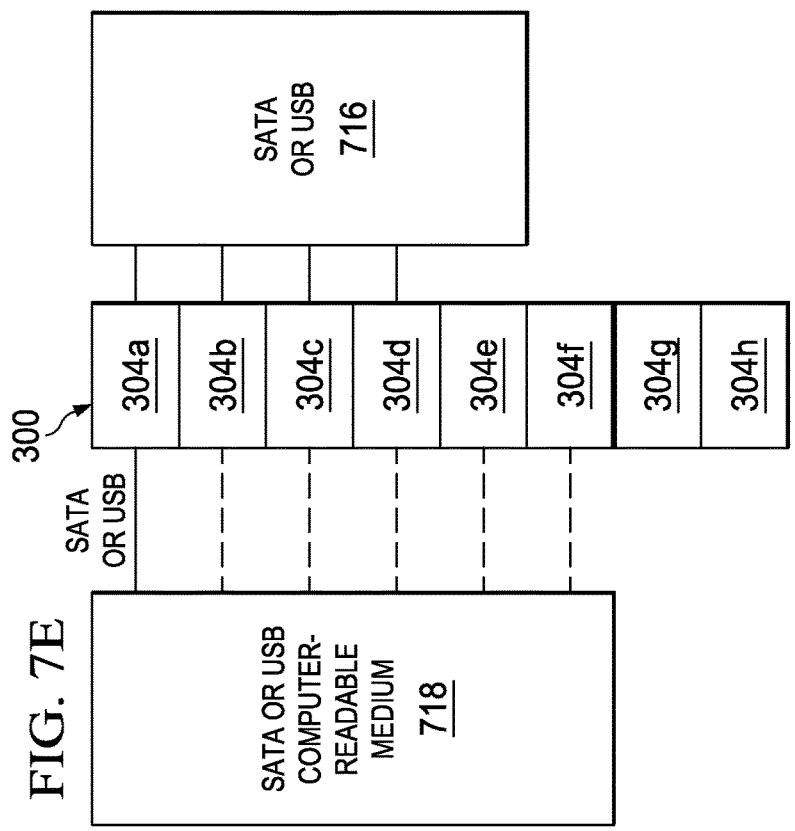

As yet another example, as shown in FIG. 7E, when coupled to a legacy SATA, SATA express, or USB computer-readable medium 718 designed for operation with the six-lane receptacle connector 200 of FIG. 2, up to one of lanes 304 (e.g., 304*a*) may transmit signals between a legacy SATA, SATA express, or USB card 712 and computer-readable medium 710, while five lanes (e.g., 304*b-f*) may not transmit despite having corresponding portions of computer-readable medium 706 engaged with pins for such two lanes. In addition, pins for lanes 304*g* and 304*h* corresponding to expanded portion 312 may not be engaged with computer-readable medium 702.

Thus, in some embodiments, as shown in the example modes described with respect to FIGS. 7A-7E, some of lanes 304 (e.g., 304*e*, 304*f*) may be dedicated to a particular communication standard while others (e.g., 304*a*, 304*b*, 304*c*, 304*d*) may be shared in the sense that communication via such lanes is based on the communication standard of the controller to which receptacle connector 300 interfaces.

Figure 8A:
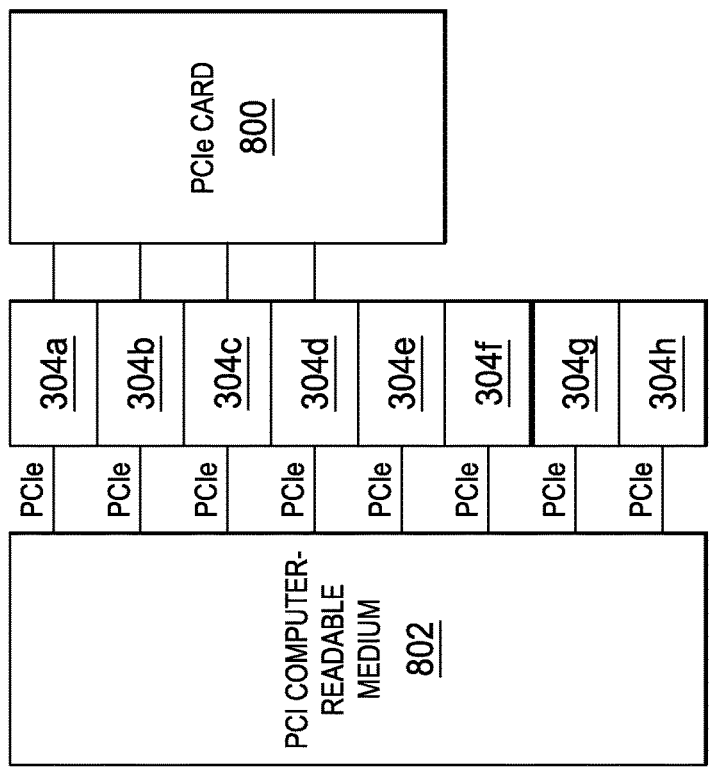
Figure 8B:
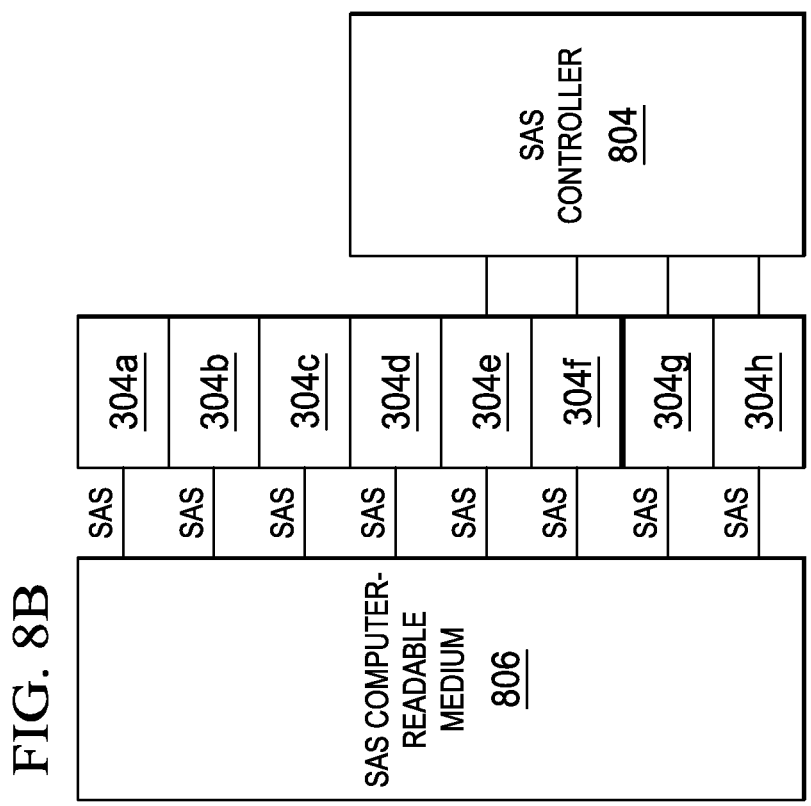

FIGS. 8A and 8B show modes of operation supporting signal communication with a computer-readable medium 602 designed for operation with the eight-lane receptacle connector 300 of FIG. 3. For example, as shown in FIG. 8A, when coupled to a PCIe computer-readable medium 802, up to eight of lanes 304 may transmit signals between a PCIe card/controller 800 and computer-readable medium 802.

As another example, as shown in FIG. 8B, when coupled to a SAS computer-readable medium 806 designed for operation with the eight-lane receptacle connector 300 of FIG. 3, up to eight of lanes 304 may transmit signals between a SAS controller 804 and computer-readable medium 806. Thus, in some embodiments, as shown in the example modes described with respect to FIGS. 8A and 8B, each of lanes 304 may be shared between communication standards.

In addition, the supported permutations of PCIe, SAS, SATA, and USB shown in FIGS. 7A-7E, may be supported in eight-lane connector embodiments.

Although the present disclosure has been described in detail, it should be understood that various changes, substitutions, and alterations can be made hereto without departing from the spirit and the scope of the disclosure as defined by the appended claims.

What is claimed is:

1. An interface for an information handling system comprising a connector, wherein the connector comprises:
  a legacy portion comprising a first receptacle having a plurality of signal pins defining a first set of lanes of communication between the information handling system and an information handling resource coupled to the connector; and
  an expanded portion comprising a second receptacle having a plurality of signal pins defining a second set of lanes of communication between the information handling system and an information handling resource coupled to the expanded portion;
  wherein the legacy portion and the expanded portion are configured such that:
    when an information handling resource is coupled to the connector such that the first receptacle is occupied with a corresponding connector of the information handling resource and the second receptacle is unoccupied, the connector enables communication between the information handling system and the information handling resource via one or more lanes comprising the first set of lanes; and
    when an information handling resource is coupled to the connector such that the first receptacle and the second receptacle are occupied with the connector of the information handling resource, the connector enables communication between the information handling system and the information handling resource via eight lanes comprising the first set of lanes comprising six lanes and the second set of lanes comprising two lanes.

2. The interface of claim 1, wherein the legacy portion has a structure substantially similar to an existing connector having a set of lanes equal in number to the first set of lanes.

3. The interface of claim 1, wherein the legacy portion has a structure substantially similar to an SFF-8639 or an SFF-9639 connector.

4. The interface of claim 1, wherein each of the six lanes in the first set of lanes and each of the two lanes in the second set of lanes are configured to communicate via communication standard selected from a Peripheral Components Internet Express (PCIe) and a Serial Attached SCSI (SAS).

5. The interface of claim 1, wherein each lane comprising the first set of lanes and the second set of lanes comprises a differential bidirectional communication lane.

6. The interface of claim 1, wherein each of the six lanes comprising the first set of lanes and each of the two lanes comprising the second set of lanes is configured to communicate via the SAS standard.

7. The interface of claim 6, wherein each of the six lanes comprising the first set of lanes and each of the two lanes comprising the second set of lanes is configured to communicate via PCIe.

8. The interface of claim 1, wherein one or more lanes comprising the first set of lanes and the second set of lanes are capable of being shared between a first communication standard and a second communication standard.

9. The interface of claim 8, wherein each of the first communication standard and the second communication standard may comprise Peripheral Component Interconnect Express, Serial Attached Small Computer System Interface, Universal Serial Bus, and Serial Advanced Technology Attachment, wherein the first communication standard and a second communication standard are different.

10. A method for transferring data, comprising:
  coupling a connector to a controller, the connector comprising a legacy portion comprising a first receptacle having a plurality of signal pins defining a first set of lanes of communication between an information handling system and an information handling resource coupled to the connector and an expanded portion comprising a second receptacle having a plurality of signal pins defining a second set of lanes of communication between the information handling system and an information handling resource coupled to the expanded portion, wherein the controller controls the first set of lanes and the second set of lanes;

communicating data between the information handling system and an information handling resource via six lanes comprising the first set of lanes when the information handling resource is coupled to the connector such that the first receptacle is occupied by the connector and the second receptacle is unoccupied; and communicating data between the information handling system and an information handling resource via two lanes comprising the first set of lanes and the second set of lanes when the information handling resource is coupled to the connector such that the first receptacle and the second receptacle occupy the connector of the information handling resource.

11. The method of claim 10, wherein the legacy portion has a structure substantially similar to an existing connector having a set of lanes equal in number to the first set of lanes.

12. The method of claim 10, wherein the legacy portion has a structure substantially similar to an SFF-8639 or an SFF-9639 connector.

13. The method of claim 10, wherein the six lanes in the first set and the two lanes in second set are all configured to communicate via a Peripheral Component Interconnect Express (PCIe) standard.

14. The method of claim 10, wherein the six lanes in the first set and the two lanes in the second set are all configured to communicate via a Serial Attached SCSI.

15. The method of claim 10, wherein each lane comprising the first set of lanes and the second set of lanes comprises a differential bidirectional communication lane.

16. The method of claim 10, wherein the controller is configured to communicate data via a first portion of the one or more lanes via a first communication standard and via a second portion of the one or more lanes via a second communication standard.

17. The method of claim 16, wherein the single communication standard comprises one of Peripheral Component Interconnect Express, Serial Attached Small Computer System Interface, wherein the single communication standard comprises one of Peripheral Component Interconnect Express, Serial Attached Small Computer System Interface, Universal Serial Bus, and Serial Advanced Technology Attachment Serial Bus, and Serial Advanced Technology Attachment.

18. The method of claim 10, wherein the controller is configured to select between a first communication standard and a second communication standard for communicating data via at least one of the one or more lanes comprising the first set of lanes and the second set of lanes.

19. The method of claim 18, wherein each of the first communication standard and the second communication standard may comprise Peripheral Component Interconnect Express, Serial Attached Small Computer System Interface, Universal Serial Bus, and Serial Advanced Technology Attachment, wherein the first communication standard and a second communication standard are different.

* * * * *